United States Patent [19]

Chapman et al.

[11] Patent Number: 4,570,752

[45] Date of Patent: Feb. 18, 1986

[54] FOLDABLE SAW HORSE

[76] Inventors: Richard E. Chapman, 804 Lancer Ct., Shorewood, Ill. 60435; Gary V. Moyer, 807 May Ct., Channahon, Ill. 60410

[21] Appl. No.: 693,905

[22] Filed: Jan. 22, 1985

[51] Int. Cl.$^4$ .............................................. F16M 11/00

[52] U.S. Cl. .................................... 182/155; 182/186; 182/226

[58] Field of Search ............... 182/186, 226, 181, 182, 182/183, 225, 155, 153

[56] References Cited

U.S. PATENT DOCUMENTS

| | | | |
|---|---|---|---|
| 1,261,007 | 4/1918 | Beardsley | 182/186 |
| 1,711,328 | 4/1929 | Russell | 182/155 |
| 1,846,144 | 2/1932 | Risbridger | 182/186 |
| 2,231,519 | 2/1941 | Claude-Mantle | 182/226 |
| 2,243,557 | 3/1944 | Johnson | 182/186 |
| 2,261,217 | 11/1941 | Bond | 182/226 |
| 2,594,464 | 4/1952 | Loucks | 182/155 |
| 2,673,765 | 3/1954 | Storck | 182/155 |

*Primary Examiner*—Reinaldo P. Machado

*Attorney, Agent, or Firm*—Ernest Kettelson

[57] ABSTRACT

A foldable saw horse which may be constructed of conventional wood two-by-fours, comprising a cross beam, a first pair of foldable legs at one end of the cross beam, and a second pair of foldable legs at the other end. Each pair of foldable legs include U-shaped brackets on each leg near the upper end connected by a hinge pin, for pivoting the legs between a spread apart working position and a side-by-side intermediate folded position. Each hinge pin in turn is connected at its inward facing end to a pivot plate pivotally mounted on a second hinge pin secured to the underside of the cross bar inset from each opposite end, each second hinge pin extending in a direction perpendicular to that of each first hinge pin. Thus, when the legs of each pair have been pivoted to the intermediate folded position on each first hinge pin, they may then be pivoted on each second hinge pin to the final folded position in side-by-side relationship to the cross beam. Hooks or other retaining means may be provided to hold the legs in the final folded position for convenience in carrying and storing.

9 Claims, 9 Drawing Figures

FOLDABLE SAW HORSE

BACKGROUND OF THE INVENTION

This invention relates to the field of foldable saw horses.

Prior art devices of this kind have been made primarily of metal. The present invention uses ordinary wood two-by-fours for the cross bar and legs, with a universal type hinge bracket assembly for connecting the wood legs to the wood cross beam in a way that enables the legs to first fold together from the spread apart working position, and to then fold against the cross beam in side-by-side relationship for the final folded position.

Advantages of using wood two-by-fours for the construction are ease of manufacture, stability of the saw horse, relative economy of materials, durability of wood for long periods of time without rusting, corrosion and other deteriorating characteristics of many metals less danger of damage to saw blades, drills and other tools which inadvertently cut through work pieces being held on the saw horse, to nails and spikes which may be inadvertently driven completely through a work piece, and nails can be driven into the legs as well as the cross beam of a wooden saw horse for connecting braces and other items thereto, for nailing in place to the floor, and the like. Also, if a leg becomes broken, it is a relatively simple matter to saw another two-by-four of appropriate length, cut away the upper portion to provide a diagonal bearing surface to bear against cross beam so the leg will extend outwardly at an oblique angle, and connect the hinge bracket assembly thereto by ordinary wood screws. In other words, the saw horse in accordance with the present invention can be readily repaired for use indefinitely into the future.

Prior art saw horses of the foldable type made primarily of metal are typically thrown into the junk heap as soon as one leg or other part becomes broken, since the cost to repair may exceed the price of a new one and in any event there are fewer people readily available to make repairs to metal devices. Also metal parts for foldable saw horses of the metal type are virtually nonexistent. They would have to be custom made, or made from other scrap parts if such could be found that could somehow be adapted for replacement of the broken metal part.

Wood two-by-fours and workmen with saws are always readily available at every construction project, which is all that is needed to replace or repair a broken leg or broken cross beam of a foldable saw horse in accordance with the present invention.

SUMMARY OF THE INVENTION

It is an object of the invention to provide a foldable saw horse whose cross beam and legs can be made of ordinary wood two-by-fours, or wood pieces of other size.

It is an object of the invention to provide a foldable saw horse having a cross beam and legs which can be readily replaced or repaired by ordinary and readily available workmen.

It is an object of the invention to provide a foldable saw horse having a cross beam and legs which last indefinitely on into the future, not subject to rust, corrosion or other deterioration characteristic of metals.

It is an object of the invention to provide a foldable saw horse having a universal type hinge assembly to enable pivotal movement of the legs between a spread apart working position and an intermediate side-by-side folded position and to also enable pivotal movement between said intermediate folded position and a final folded position of said legs in side-by-side relationship with the cross beam.

DESCRIPTION OF PREFERRED EMBODIMENT

Figure 1:
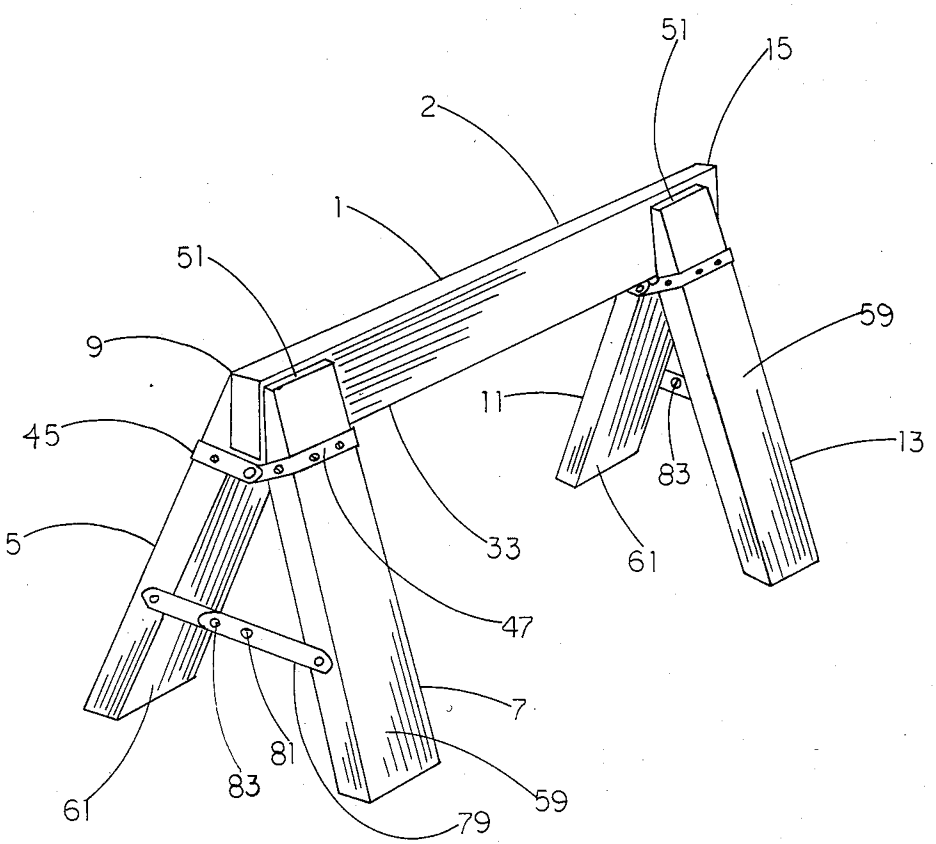
FIG. 1 is a perspective view of a foldable saw horse in accordance with the present invention, shown in its unfolded working position.
Figure 4:
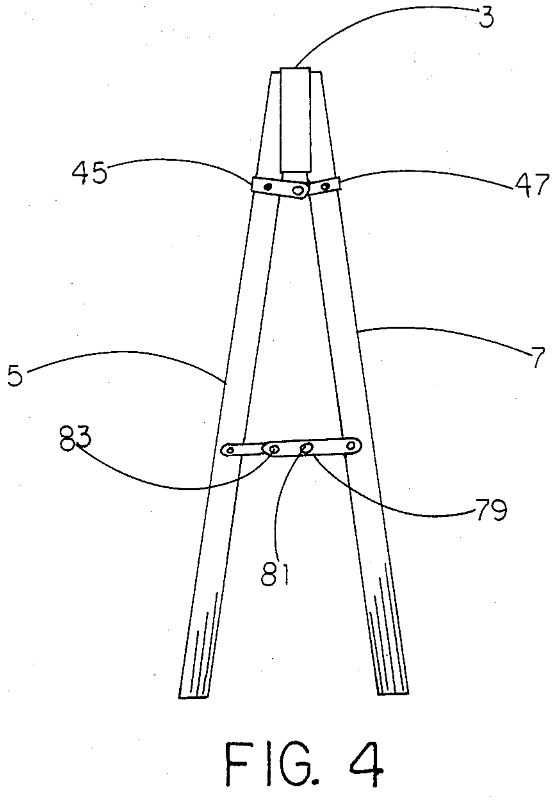
FIG. 4 is an end elevation view of a foldable saw horse in accordance with this invention, shown in its unfolded working position.
Figure 2:
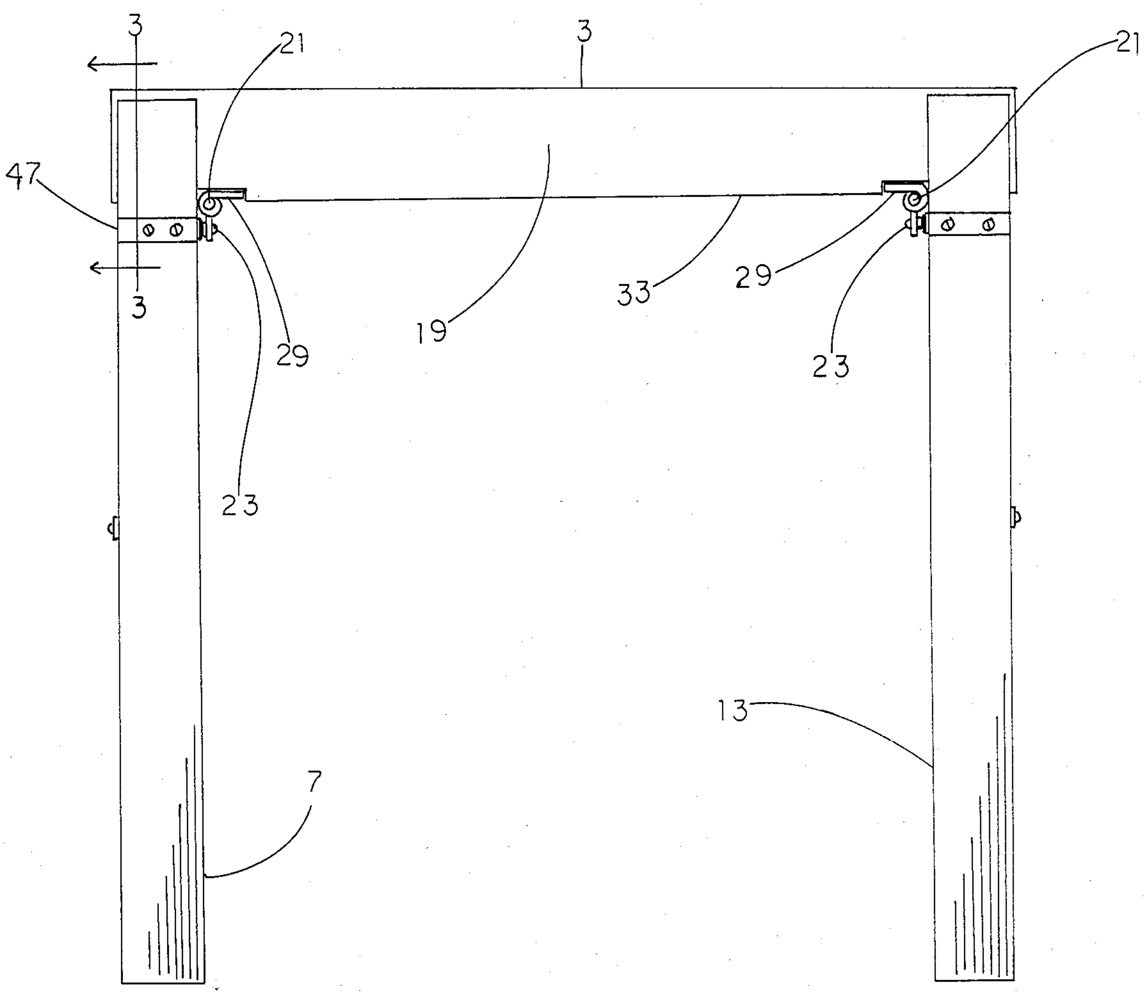
FIG. 2 is a side elevation view of a foldable saw horse in accordance with the present invention in its working position.
Figure 3:
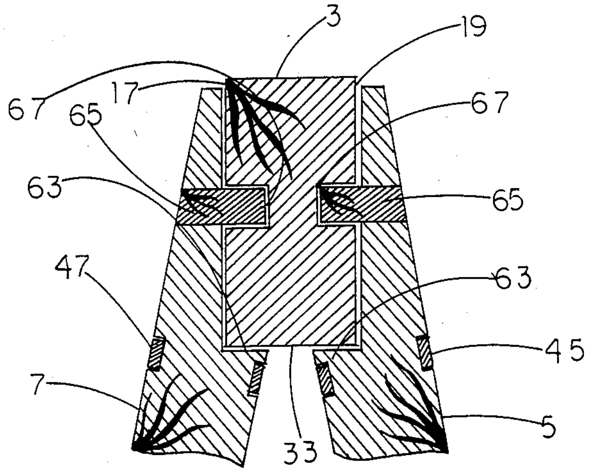
FIG. 3 is a section view taken on line 3—3 of FIG. 2.
Figure 5:
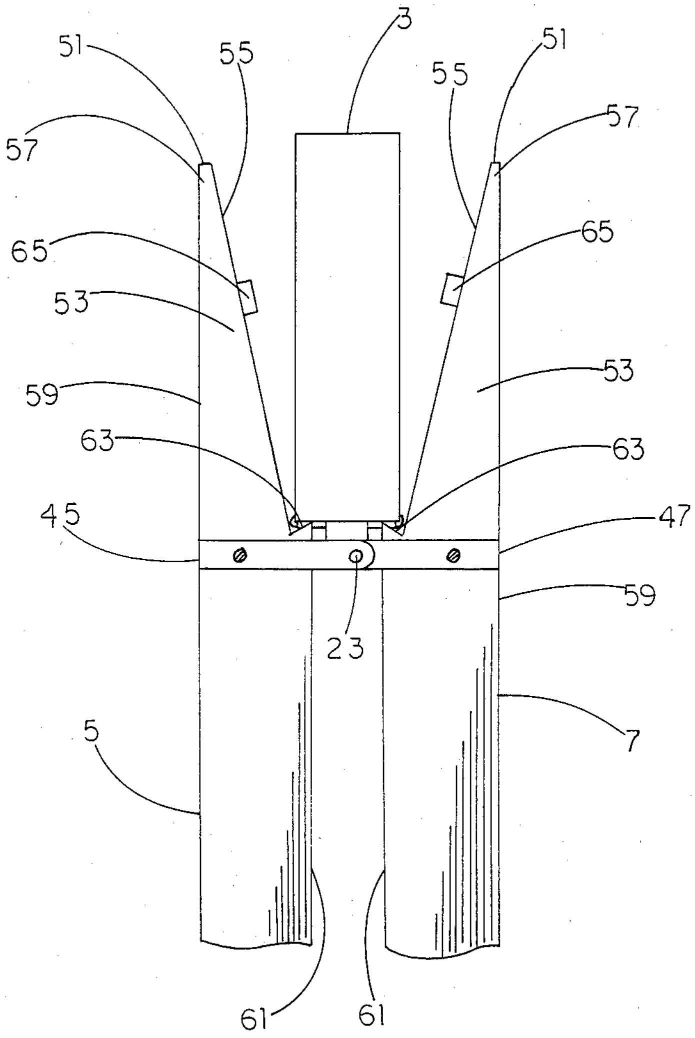
FIG. 5 is an enlarged end elevation view of the upper portion of a foldable saw horse in accordance with this invention, showing the legs pivoted to an intermediate folded position.

A foldable saw horse 1 in accordance with the present invention may be made of wooden two-by-fours which has been the standard material for making conventional non-foldable saw horses. It has the economy, stability and durability of conventional wooden saw horses but adds the inventive feature of making such a saw horse foldable for ease of carrying and storing.

The foldable saw horse 1 includes a cross beam 3, a first pair of foldable legs 5 and 7 at a first end 9 of the cross beam 3, and a second pair of foldable legs 11 and 13 at the opposite second end 15 of the cross beam 3.

Each pair of foldable legs are connected to the cross beam 3 in the same manner, so only the connection of one pair will be described in detail. The connection enables pivoting each pair of foldable legs between a rigid working position wherein each leg 5 and 7, and 11 and 13, extend diagonally from the cross beam 3 diverging outwardly from each respective side wall 17 and 19 of the cross beam 3 in the direction away from the cross beam 3, and a folded position wherein each leg of each pair is brought together in side-by-side substantially parallel relationship to each other and pivoted to a position alongside the cross beam 3 also in substantially parallel relationship thereto.

The connecting means includes a universal type pivot bracket having two pivot pins, a first pivot pin 21 extending in one direction and a second pivot pin 23 positioned to extend in a direction normal to the first pivot pin 21. The first pivot pin 21 is received in the spaced apart looped ends 25 and 27 of a mounting plate 29, having screw holes 31 therein for mounting by means of wood screws to the underside 33 of the cross beam 3 near an end region thereof to which one pair of the foldable legs 5 and 7 or 11 and 13 are to be connected.

The looped end 35 of a pivot plate 37 is positioned between the spaced apart looped ends 25 and 27 of the mounting plate 29, the bore through the looped end 35 of pivot plate 37 being in registration with the bores through the looped ends 25 and 27 of the mounting plate 29 whereby the first pivot pin 21 extends through the bore of looped end 35 of pivot plate 37 when it is received through the bores of looped ends 25 and 27 of the mounting plate 29. The pivot plate 37 is thereby rotatably mounted on the first pivot pin 21.

The second pivot pin 23 has a threaded shank 39 which extends through a centrally located aperture in the pivot plate 37 and outwardly therefrom in a direction which is normal to that of the first pivot pin 21. The second pivot pin 23 is secured to the pivot plate 37 by a pin head 41 bearing against one side thereof and a nut 43 threadedly tightened against the other side of pivot plate 37.

The pivot plate 37 and second pivot pin 23 may thus pivot between an extended position which is substantially normal or perpendicular to the cross beam 3 and a folded position which is substantially parallel to the cross beam 3 when the mounting plate 29 has been secured to the underside 33 thereof.

A pair of U-shaped support brackets 45 and 47 are pivotally mounted on the second pivot pin 23, on opposite sides thereof. In the first pair of foldable legs, the leg 5 is received in and secured to pivotable support bracket 45 and the leg 7 is received in and secured to pivotable support bracket 47, secured by wood screws 49, at a location inwardly from the upper end 51 of each leg 5 and 7 a distance substantially equal to the width of the side walls 17 and 19 of cross beam 3.

Thus, a bearing portion 53 of each leg 5 and 7 extends upwardly from each support bracket 45 and 47 to bear against the respective side walls 17 and 19 of cross beam 3 when said foldable legs are pivoted to the working position. The bearing portion 53 of each leg 5 and 7, as well as of each leg 11 and 13 of the second pair, includes a diagonally extending bearing face 55, tapering from a near point or narrowed portion 57 at the upper end 51 of each of said legs and diverging away from the outwardly facing side wall 59 of each of said legs and toward the inwardly facing side wall 61 thereof, terminating at an inwardly cut ledge portion 63 adjacent the location where said pivotable support bracket 45 and 47 respectively is secured to said respective legs 5 and 7.

When in the working position of said foldable legs, the diagonal bearing face 55 of each leg 5, 7, 11 and 13 bears flush against their respective side wall portion of cross beam 3, the underside 33 of cross beam 3 at such time resting on the ledge portion 63 of each of said legs. The foldable legs 5, 7, 11 and 13 at such time extend diagonally outwardly from respective opposite sides of the cross beam 3, and in a direction that is normal to the longitudinal axis of the cross beam 3.

The legs 5, 7, 11 and 13 are held in the position that is normal to the longitudinal axis of cross beam 3 by wood dowel pins or lugs 65, one projecting from the diagonal bearing face 55 of each leg, seating in corresponding holes 67 formed in the side wall of cross beam 3 at locations to receive the respective lug 65 of each leg as its bearing face 55 is brought into bearing relationship against their respective side wall portion of the cross beam 3.

The pivotable support brackets 45 and 47 each include a pair of outwardly extending arms 69 which extend outwardly from opposite sides of the second pivot pin 23, perpendicular thereto, and terminate at a cross bar 71. The arms 69 of support brackets 45 and 47 are pivotable on the second pivot pin 23 between a working position in which the foldable legs 5, 7, 11 and 13 are spread apart extending diagonally from cross beam 3, with their respective bearing faces 55 abutting against the side wall of cross beam 3 and with their respective lugs 65 seated in respective holes 67 of cross beam 3, and an intermediate folded position in which the foldable legs 5 and 7 of the first pair are folded into substantially parallel side-by-side relationship to each other and the same is done with the legs 11 and 13 of the second pair, the diagonal bearing faces 55 of each leg at such time being drawn away from the side wall of cross beam 3 and the lugs 65 withdrawn from the holes 67 thereof.

The arms 69 of the pivotable support bracket 45 extend outwardly from the pivot pin 23 a distance which is slightly greater than the thickness of the leg 5. The same for pivotable support bracket 47 and its respective leg 7. Thus, when the legs 5 and 7 are secured to the cross bar 71 of the pivotable support brackets 45 and 47 on pivot pin 23 which in turn is pivotably connected to the first pivot pin 21 and mounting plate 29 on the underside 33 of cross beam 3, the upper tapered portions of legs 5 and 7 are able to clear the respective side walls of cross beam 3 when they are pivoted to the intermediate folded position.

The legs 5 and 7 may then in turn be pivoted on the first pivot pin 21 to the final folded position, the upper bearing portion 53 of each leg and its respective outwardly projecting lug 65 being able to clear the side walls of cross beam 3 as they rotate downwardly out of facing relationship therewith until the legs 5 and 7 are brought into side-by-side relationship with the cross beam 3, substantially parallel thereto, in the final folded position.

Figure 6:
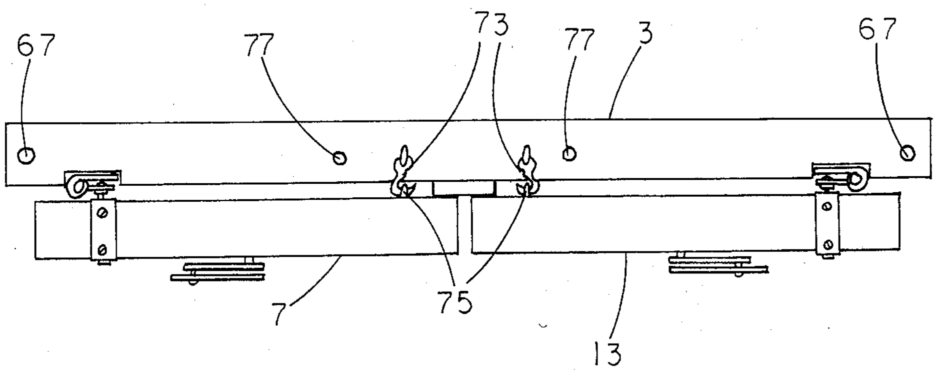
FIG. 6 is a side elevation view of a foldable saw horse in accordance with this invention, shown in its final folded position.
Figure 7:
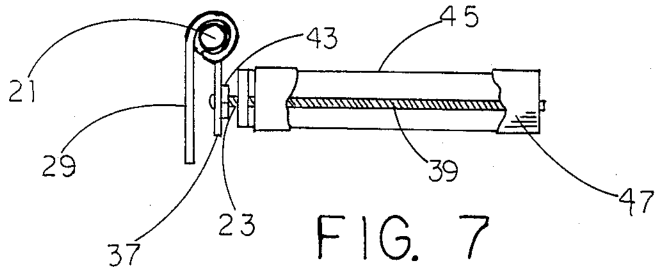
FIG. 7 is a side elevation view, partly broken away, of the universal hinge type bracket assembly for use with the foldable saw horse in accordance with this invention, showing in the final folded position.
Figure 8:
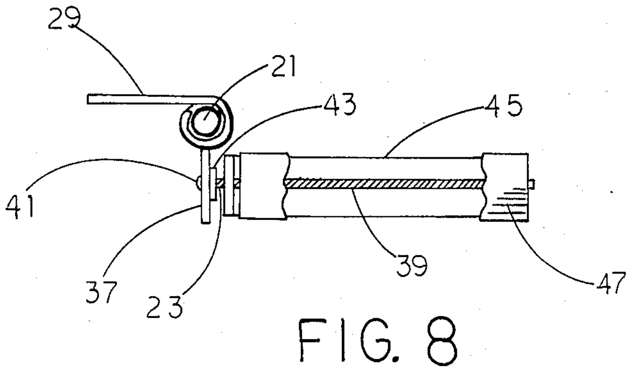
FIG. 8 is a side elevation view, partly broken away, of the universal hinge type bracket assembly of FIG. 7 shown in the working position.
Figure 9:
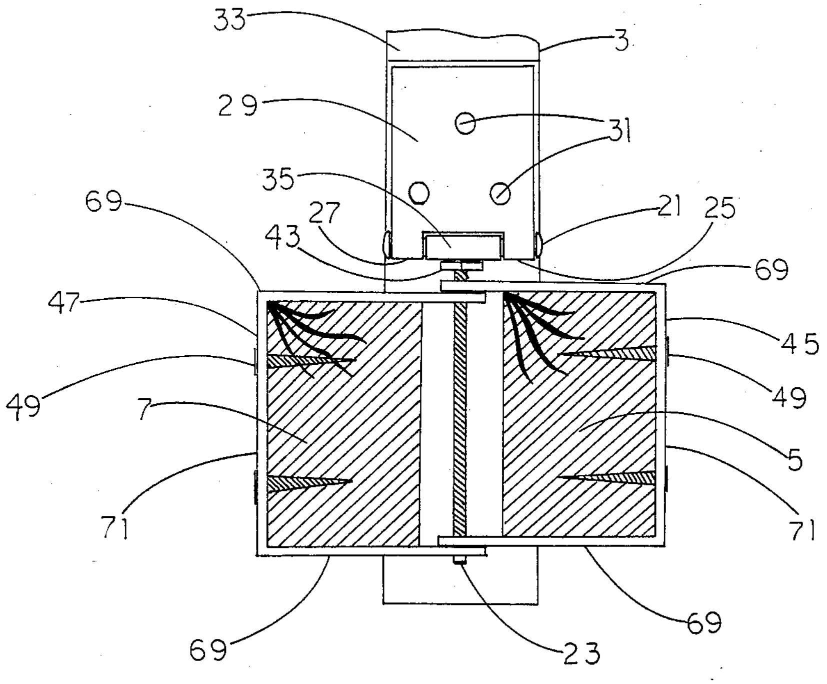
FIG. 9 is a bottom plan view of the universal hinge type bracket assembly connected to a foldable saw horse in accordance with this invention, shown in the intermediate working position.

As shown in FIG. 6, hooks 73 may be provided along the side walls of cross beam 3 to hook into eylets 75 provided along the edge of legs 5, 7, 11 and 13, to hold them in substantially parallel side-by-side relationship with cross beam 3 when in the final folded position. Retaining pins 77 may be provided along the side walls of cross beam 3 to receive the hooks 73 when the legs 5, 7, 11 and 13 are in the working position, to keep the hooks from dangling and to keep them neatly in place.

Scissor type stabilizing arms 79 are connected between each pair of foldable legs 5 and 7, and 11 and 13, at a location about midway between the top and bottom thereof. The stabilizing arms 79 include a centrally located pivot pin 81, on which they are pivotally movable between a folded position when the legs 5 and 7, and 11 and 13 are brought together in the intermediate folded position, and an in-line extended position when the legs 5 and 7, and 11 and 13 are spread apart in their working position. When in the in-line extended position, a detent member 83 on one part of the stablizing arms 79 seats in a corresponding recess of an overlapping portion of the other part to lock the scissor type stabilizing arms 79 in place in the extended in-line position, thereby holding the legs 5 and 7, and 11 and 13 in their spread apart working position.

Even though the present invention has been developed to take particular advantage of the fact that wood two-by-fours may be used in its construction, other materials may be used within the scope of this invention.

We claim:

1. A foldable saw horse, comprising a cross beam, a first pair of legs, each leg in said first pair having a solid imperforated cross-section throughout, said first pair of legs including a first right leg to the right side of said cross beam and a first left leg to the left side of said cross beam, a second pair of legs, each leg in said second pair having a solid imperforated cross-section throughout, said second pair of legs including a second right leg to the right side of said cross beam and a second left leg to the left side of said cross beam, a first separable universal pivot assembly connecting said first pair of legs to a first end region of said cross beam for first pivotal movement of said first right leg and said first left leg between a spread apart working position and an intermediate folded position in side-by-side relationship to each other and for second pivotal movement of said first pair of legs between said intermediate folded position and a final folded position adjacent said cross beam substantially parallel therewith, a second separable universal pivot assembly connecting said second pair of legs to a second opposite end region of said cross beam for first pivotal movement of said second right leg and said second left leg between a spread apart working position and an intermediate folded position in side-by-side relationship to each other and for second pivotal movement of said second pair of legs between said intermediate folded position and a final folded position adjacent said cross beam substantially parallel therewith, said universal pivot assemblies each include a single longitudinally extending pivot pin and a single laterally extending pivot pin, said respective right and left legs of each pair being connected at their upper end region to said single longitudinally extending pivot pin of respective ones of said universal pivot assemblies for said first pivotal movement, including means to so connect said legs of each pair to said single longitudinally extending pivot pin of respective ones of said universal pivot assemblies, said single longitudinally extending pivot pin of each of said pivot assemblies being positioned under said cross beam and including a first end facing inwardly of said cross beam and toward each other, said single laterally extending pivot pin of each of said pivot assemblies being connected to said first end of respective ones of said single longitudinally extending pivot pins of each of said pivot assemblies for said second pivotal movement, including means to so connect said single laterally extending pivot pin of each of said pivot assemblies to said first end of respective ones of said single longitudinally extending pivot pins of each of said pivot assemblies, and means to connect said single laterally extending pivot pin of each of said pivot assemblies to said cross beam, the structure comprising said single longitudinally extending pivot pin under said cross beam connected to said upper end region of said right and left legs and pivotally connected at its inwardly facing first end to said laterally extending pivot pin bears against the underside of said cross beam when said pairs of legs are pivoted in said second pivotal movement from said final folded position to said intermediate folded and spread apart working position to prevent further pivotal movement beyond said intermediate folded and working positions.

2. A foldable saw horse as set forth in claim 1, wherein said solid imperforate legs each include a diagonally extending upper end adjacent to and facing said cross beam, at least one leg in each pair including a projecting lug extending from said diagonally extending upper end toward said cross beam, said cross beam including corresponding recesses positioned to receive respective ones of said lugs therein when said legs are pivoted to their said spread apart working position.

3. A foldable saw horse as set forth in claim 2, wherein said means to connect said solid imperforate legs of each pair to said single longitudinally extending pivot pin of respective ones of said universal pivot assemblies includes a first pair of separable U-shaped brackets each having a pair of outwardly extending side arms and a cross arm to extend around three sides of said solid imperforate legs around the outside thereof, the cross arm of one bracket of said pair extending across an outwardly facing portion of said first right leg for connection thereto, the cross arm of the other bracket of said pair extending across an outwardly facing portion of said first left leg for connection thereto, the said side arms of each of said brackets extending from the respective cross arms thereof in an inward direction toward each other terminating at adjacent free ends, apertures in said free ends in registration with each other to provide a single through passageway to receive said single longitudinally extending pivot pin of one of said universal pivot assemblies therethrough.

4. A foldable saw horse as set forth in claim 3, wherein said means to connect said solid imperforate legs of each pair to said single longitudinally extending pivot pin of respective ones of said universal pivot assemblies includes a second pair of separable U-shaped brackets each having a pair of outwardly extending side arms and a cross arm to extend around three sides of said solid imperforate legs around the outside thereof, the cross arm of one bracket of said second pair extending across an outwardly facing portion of said second right leg for connection thereto, the cross arm of the other bracket of said second pair extending across an outwardly facing portion of said second left leg for connection thereto, the said side arms of each of said brackets of said second pair extending from the respective cross arms thereof in an inward direction toward each other terminating at adjacent free ends, apertures in said free ends in registration with each other to provide a single through passageway to receive said single longitudinally extending pivot pin of the other of said universal pivot assemblies therethrough.

5. A foldable saw horse as set forth in claim 4, wherein said means to connect said single laterally extending pivot pin of each of said pivot assemblies to said first end of respective ones of said single longitudinally extending pivot pins of each of said pivot assemblies includes a first hinge plate hingedly mounted on said single laterally extending pivot pin of one of said universal pivot assemblies, an aperture in said hinge plate, said first end of said single longitudinally extending pivot pin of said one of said universal pivot assemblies being received in said aperture of said hinge plate and being secured thereto.

6. A foldable saw horse as set forth in claim 5, wherein said means to connect said single laterally extending pivot pin of each of said pivot assemblies to said first end of respective ones said single longitudinally extending pivot pins of each of said pivot assemblies includes a second hinge plate hingedly mounted on said single laterally extending pivot pin of the other of said universal pivot assemblies, an aperture in said second hinge plate, said first end of said single longitudinally extending pivot pin of said other of said universal pivot assemblies being received in said aperture of said second hinge plate and being secured thereto.

7. A foldable saw horse as set forth in claim 6, wherein said means to connect said single laterally extending pivot pin of each of said pivot assemblies to said cross beam includes a first mounting bracket member separably secured to said cross beam at said first end region thereof and a second mounting bracket member separably secured to said cross beam at said second opposite end region thereof, said first mounting bracket member supporting said single laterally extending pivot pin of one of said universal pivot assemblies under said cross beam and laterally thereof at said first end region, said second mounting bracket member supporting said single laterally extending pivot pin of the other of said universal pivot assemblies under said cross beam and laterally thereof at said second opposite end region.

8. A foldable saw horse as set forth in claim 7, wherein said first and second pairs of U-shaped brackets are adapted for use with any type of legs which have a solid cross-section for strength and durability made of any material without the need for perforations cut therethrough which weaken the legs, and for connection of any such solid imperforate legs to said cross beam for said first and second pivotal movements thereon and in relation thereto.

9. A foldable saw horse as set forth in claim 8, wherein said solid imperforate legs are wood.

* * * * *